United States Patent
Bejach

[15] 3,670,235
[45] June 13, 1972

[54] MOTOR CONTROL SYSTEM WITH COMPENSATION FOR LOW-FREQUENCY VARIATIONS IN MOTOR ENERGIZING VOLTAGE

[72] Inventor: Benton Bejach, Santa Ana, Calif.
[73] Assignee: Borg-Warner Corporation, Chicago, Ill.
[22] Filed: Sept. 25, 1970
[21] Appl. No.: 75,472

[52] U.S. Cl. ................................................ 321/18, 318/230
[51] Int. Cl. ........................................................... H02m 1/08
[58] Field of Search ................... 321/2, 5, 18; 318/227, 230, 318/231; 307/228, 229

[56] References Cited

UNITED STATES PATENTS

| | | | |
|---|---|---|---|
| 3,418,557 | 12/1968 | Schaefer | 321/18 |
| 3,275,926 | 9/1966 | Sheheen | 307/228 X |
| 3,331,003 | 7/1967 | King | 318/231 |
| 3,517,301 | 6/1970 | Huber | 321/18 X |
| 3,341,737 | 9/1967 | Rosa | 321/2 X |
| 3,153,152 | 10/1964 | Hoffman | 307/229 |

FOREIGN PATENTS OR APPLICATIONS 1,148,439   4/1969   Great Britain ........................... 321/18

Primary Examiner—William H. Beha, Jr.
Attorney—Donald W. Banner, William S. McCurry and John W. Butcher

[57] ABSTRACT

A phase-shift stabilizer is connected in series with an inverter to provide a selective phase-shift of the individual timing pulses passed to the inverter, while maintaining a constant average frequency of these timing pulses. A rectifier circuit in a feedback line from the inverter output side provides a control voltage signal which modifies the phase-shift of each timing pulse in a direction and by an amount appropriate to offset undesired low-frequency fluctuation in the average output voltage from the inverter. The phase-shift stabilizer includes a sawtooth generator for producing a constant amplitude output signal varying in frequency as a function of a frequency regulating signal. A filter is connected to provide a signal which is a function of the undesired low-frequency modulation of the inverter output. A comparator circuit is connected to receive a composite signal formed by mixing the filter output and sawtooth generator signals, and to compare the composite signal against a reference signal. The comparator provides a phase-shifted output signal for controlling the inverter frequency to compensate for the unwanted low-frequency modulation.

9 Claims, 16 Drawing Figures 3,670,235
SHEET 1 OF 4
FIG. 1
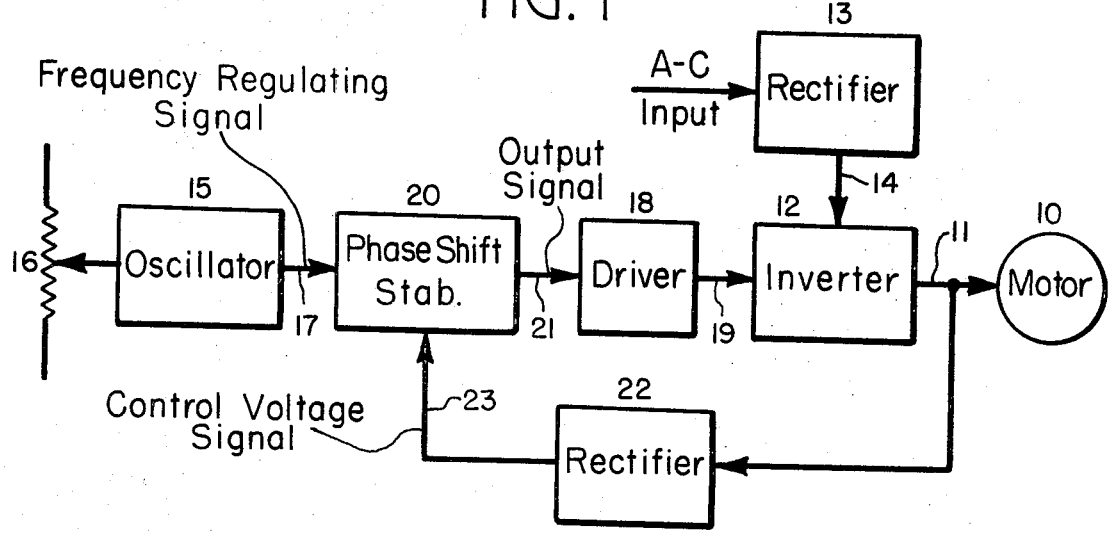
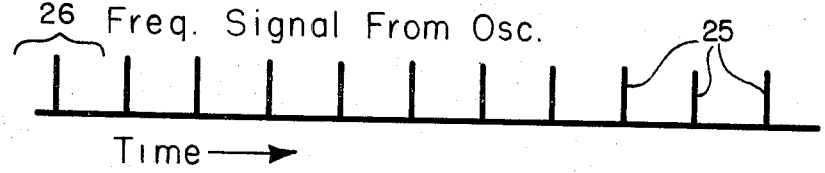
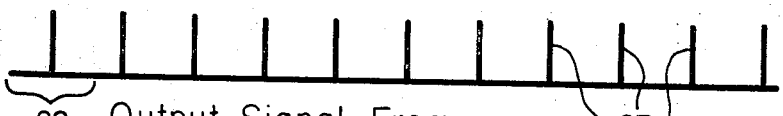
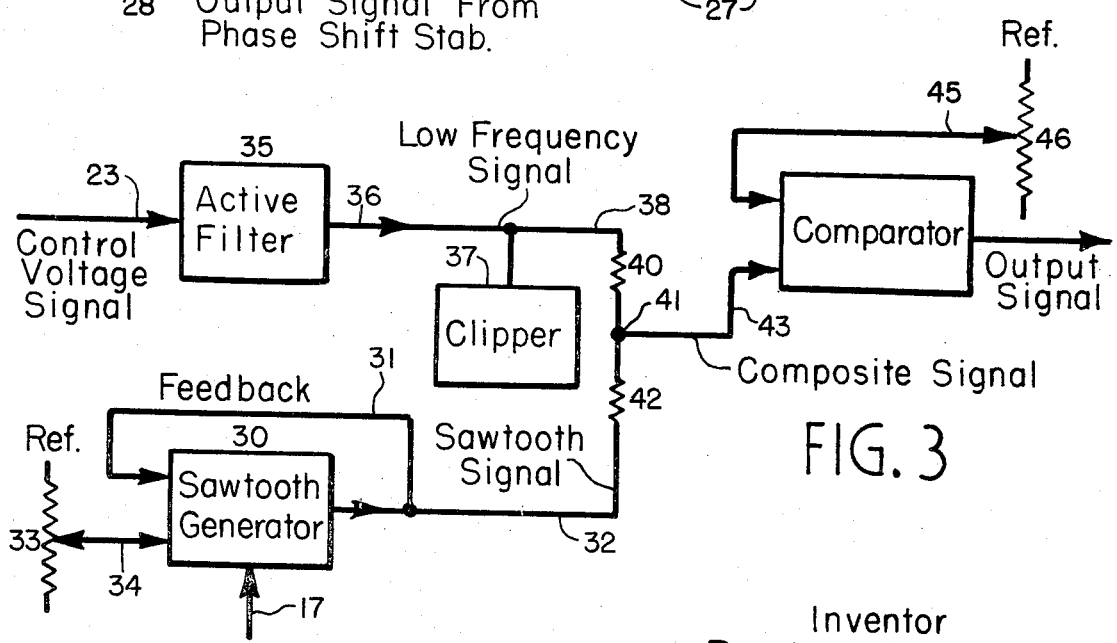
FIG. 3
Inventor
Benton Bejach
By James J. Jennings, Jr.
Attorney Inventor
Benton Bejach By James J. Jennings, Jr.
Attorney Inventor
Benton Bejach By James J. Jenninger, Jr.
Attorney

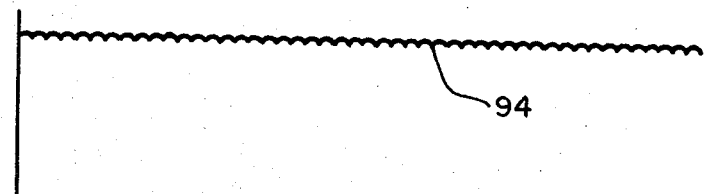
FIG. 7A
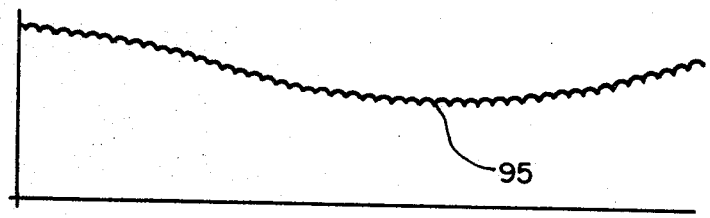
FIG. 7B
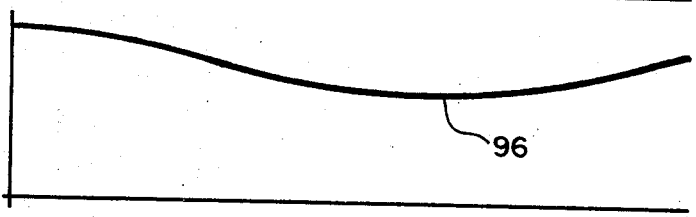
FIG. 7C
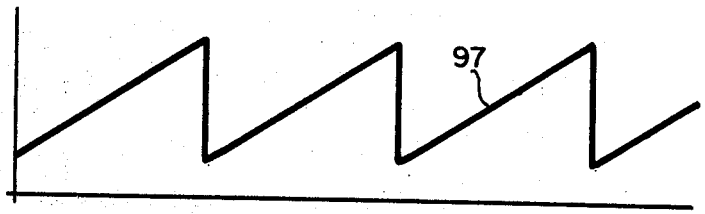
FIG. 7D
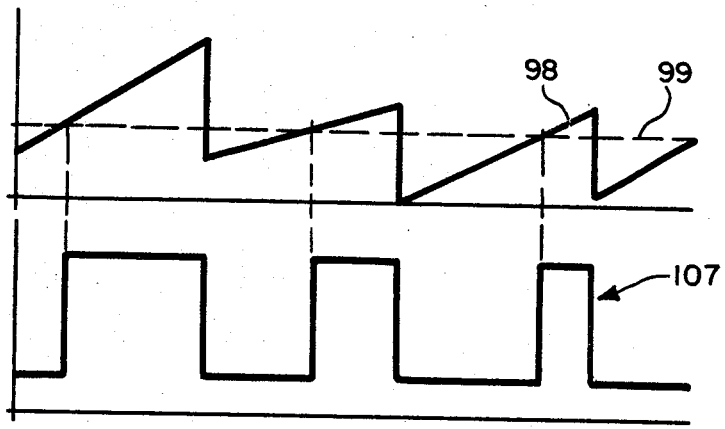
FIG. 7E
FIG. 7F
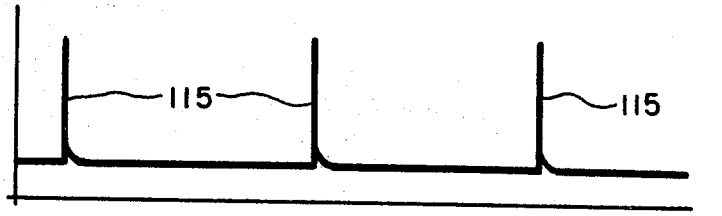
FIG. 7G
Inventor
Benton Bejach
By James J. Jennings, Jr.
Attorney

MOTOR CONTROL SYSTEM WITH COMPENSATION FOR LOW-FREQUENCY VARIATIONS IN MOTOR ENERGIZING VOLTAGE

BACKGROUND OF THE INVENTION

In the motor speed control art it now is generally known that accurate speed of an a-c motor can be maintained by closely regulating the frequency of timing pulses supplied from a precise oscillator to the inverter which produces the a-c energizing voltage for the motor. The inverter can be energized from any suitable d-c source, such as a rectifier circuit, one or more batteries, a fuel cell, or other arrangement. The oscillator may be a precise arrangement such as a voltage-controlled oscillator (VCO) in which a carefully regulated d-c voltage is utilized to govern the frequency of the oscillator timing pulses. These pulses may be fed directly or through a driver stage to the inverter to regulate the frequency of firing the SCR's or other switches in the inverter, and thus correspondingly effect a regulation of the inverter output voltage to produce a concomitant variation in the motor speed.

One problem that arises with such systems is the occasional presence of an unwanted low-frequency modulation signal on the inverter a-c output voltage utilized to energize the a-c motor, whether synchronous, synchronous reluctance, or an induction motor. Such modulation or continuous oscillations, most common at low inverter frequencies (for example, up to ten Hertz), is generally the result of inverter-motor interaction, although the motor alone can give rise to such oscillations. In addition a sudden increase in the load on an a-c motor may produce a momentary instability which is reflected back as this undesired low-frequency modulation.

One significant advance in the correction of the total system operation to compensate this unwanted modulation is described and claimed in U.S. Pat. No. 3,482,157—Borden et al., which issued Dec. 2, 1969, and is assigned to the assignee of this invention. As there described a demodulator unit senses the unwanted aberration in the inverter a-c output voltage, and inserts an offset or correcting signal directly into the oscillator which provides the timing pulses for controlling the frequency of inverter operation. Although substantial improvement was noted, there was still some disturbance of the additional motors when another motor was line started. Moreover the described system does not admit of ready incorporation with a system in which the oscillator is a fixed or digitally-controlled frequency source. It was also noted that some speed errors, not similar to the average type speed error but rather "long tailed" transient errors, were probably derived from the bandpass filter arrangement utilized in that system to effect the low-frequency compensation. This may result in some speed error in the a-c motor(s) being controlled by the system.

It is therefore a primary consideration of the present invention to provide an a-c motor control system with low-frequency compensation such that a line start of a single motor will minimize disturbances to the already-operating system.

Another important consideration of this invention is the provision of such a system which can readily be utilized with oscillators of the fixed frequency or digitally-controlled types to provide precise speed control of the motor(s).

Another important consideration is the provision of a motor speed control system in which the desired compensation is effected while insuring that the average frequency of the timing pulses supplied to the inverter is precisely the same as the average frequency of the basic timing pulses derived from a precisely controlled oscillator or frequency source.

SUMMARY OF THE INVENTION

The control system of the present invention is useful with an arrangement in which an inverter provides an a-c voltage for energizing an a-c motor. Such systems normally utilize an oscillator for supplying a frequency regulating signal, such as timing pulses, to regulate the inverter operation. This in turn regulates the frequency of the inverter a-c output voltage to control the a-c motor speed.

Particularly in accordance with the present invention, a phase-shift stabilizer is coupled in series between the oscillator and the inverter. The stabilizer includes circuit means for effecting a controlled phase-shift of the individual timing pulses received from the oscillator, while maintaining constant the average frequency of the output pulse signals supplied to control the inverter operation. Additional circuit means, such as a rectifier or a current-sensing circuit, is coupled between the inverter and the phase-shift stabilizer to provide a control voltage signal denoting low-frequency variations in the inverter a-c output voltage. This control voltage signal is used to regulate the extent of the selective phase-shift of the individual timing pulses to compensate for the undesired low-frequency oscillations in the inverter-motor system.

THE DRAWINGS

In the several figures of the drawings like reference numerals identify like elements, and in the drawings:

FIG. 1 is a block diagram of a motor control system in which a system of the present invention has been incorporated;

FIGS. 2A and 2B are illustrative showings useful in understanding the operation of the invention;

FIG. 3 is a block diagram, partly in schematic form, illustrating major components in a preferred embodiment of the invention;

FIGS. 7A–7G are graphical illustrations useful in understanding the operation of the present invention.

GENERAL SYSTEM DESCRIPTION

Figure 4:
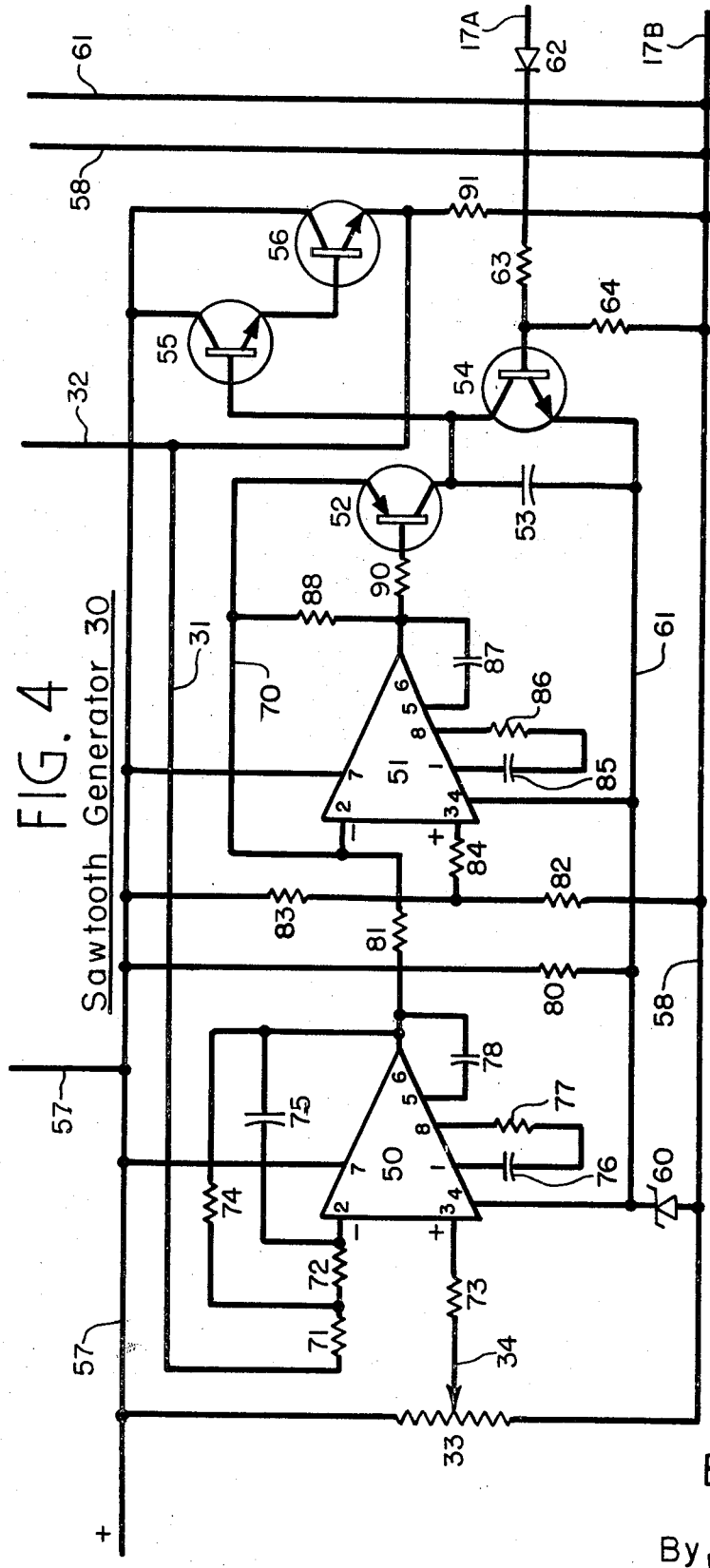
FIGS. 4 and 6 are schematic diagrams which taken together supply the circuit details of the system shown more generally in FIG. 3.

In FIG. 1 an a-c motor 10 is shown energized by the a-c output voltage received over line 11 from an inverter 12. A rectifier circuit 13 receives a-c energy and supplies a d-c energizing voltage over line 14 to the inverter. The frequency of inverter operation, and thus the frequency of its a-c output voltage, is regulated by a train of timing pulses provided by an oscillator stage 15. This oscillator can be of the voltage controlled type (VCO), which receives a d-c voltage from a potentiometer 16 to regulate the frequency of the oscillator timing pulses which appear on output line 17 as the frequency regulating signal for the system. In general such signals may be passed over a driver or amplifier stage 18, thus providing control pulses on the line 19 to regulate the switching times of the SCR's (or other switches in the inverter) and thus regulate the speed of motor 10.

In accordance with the present invention a phase-shift stabilizer 20 is coupled in series between the line 17 from the oscillator and the input line 21 to the driver stage. This stabilizer circuit produces a selective, controlled phase-shift with respect to each of the timing pulses in the frequency regulated signal, to provide an output signal on line 21 in which the average frequency of the pulses is exactly the same as the average frequency of the oscillator timing pulses. The extent of each pulse displacement is determined by a control voltage signal, which may be derived from the output side of inverter 12. A portion of the inverter a-c output voltage is passed through a rectifier circuit 22 to provide the control voltage signal on line 23 for application to the phase-shift stabilizer. Accordingly the signal on line 23 includes a component of the inverter output frequency, generally noted as a ripple effect in the waveform, in addition to any of the undesired low-frequency modulation which may be present. A suitable control voltage signal can also be derived from circuits indicating the d-c bus current, d-c bus power level, inverter power factor, turnoff time of the inverter SCR's or other appropriate circuit.

The frequency regulating signal on line 17 may contain a train of timing pulses such as the pulses 25 in FIG. 2A, which are spaced apart by the same time intervals. Each pulse signal 25 appears precisely in the center of a "window" or time interval 26 which corresponds to the period of oscillator operation. After the phase shift in stabilizer 20, the output signal pulses 27 appear as shown in FIG. 2B. Again each individual pulse appears within a window or time period as represented by bracket 28, but where necessary to compensate for the undesired low-frequency modulation of the a-c output voltage, each pulse 27 is shifted from the center of its respective window 28. However, it is emphasized that the average frequency of the output pulses 27 is maintained exactly the same as that of the input timing pulses 25, so that a precise and accurate motor speed regulation is still maintained in exact accordance with the setting of the frequency regulating signal.

DETAILED DESCRIPTION OF THE INVENTION

FIG. 3 illustrates major circuit components of the phase-shift stabilizer 20. As there shown the frequency regulating signal is applied over line 17 to a sawtooth generator circuit 30, and a feedback line 31 assists in maintaining a constant amplitude of the sawtooth signal on line 32. The frequency of this sawtooth signal is a direct function of the frequency of the signal on line 23. A reference signal is supplied from the potentiometer 33 over a line 34 to another input connection of the sawtooth generator circuit.

The control voltage signal is applied over line 23 to a filter 35, which in a preferred embodiment is an active filter. Filter 35 removes the high-frequency ripple and leaves only any undesired low-frequency modulating signal on line 36. A clipper stage 37 is connected to line 36 so that the resultant signal on line 38 is amplitude controlled, and this clipped signal is passed over a resistor 40 to terminal 41. The sawtooth voltage signal is applied over resistor 42 to the same terminal. Thus the clipped low-frequency signal is mixed with the sawtooth signal to provide a composite signal on line 43 for application to one input connection of a comparator stage 44. The other input connection of comparator stage 44 receives a reference signal over line 45 from a reference potentiometer 46. The output signal from comparator stage 44 is passed over line 21 to control the frequency of inverter operation. The mixing of the undesired low-frequency signal with the sawtooth voltage signal to provide a composite signal for application to the comparator is an important part of the inventive system, contributing to the requisite compensation of the inverter operating frequency to offset the undesired low-frequency modulation which would otherwise occur.

FIG. 4 depicts the details of the sawtooth generator circuit 30. This circuit includes first and second operational amplifiers 50 and 51, a transistor 52 coupled to the output side of op amp 51 between a feedback loop for this op amp and a charging capacitor 53 across which the sawtooth voltage waveform is developed. This circuit also includes a shorting transistor 54 for effecting discharge of capacitor 53 and restarting the cycle, and a pair of emitter-follower coupled transistors 55, 56. The circuit is energized by applying a voltage positive on conductor 57 relative to the potential on the reference conductor 58. A Zener diode 60 is coupled between reference conductor 58 and an intermediate conductor 61 to provide a potential difference between conductors 57 and 61. In general the interconnection and operation of sawtooth generators are well known and no specific circuit discussion is requisite for those skilled in the art. To minimize the need for experimentation and complete a thorough teaching of this invention, a table of typical circuit component identifications and values will be set out hereinafter.

Figure 5:
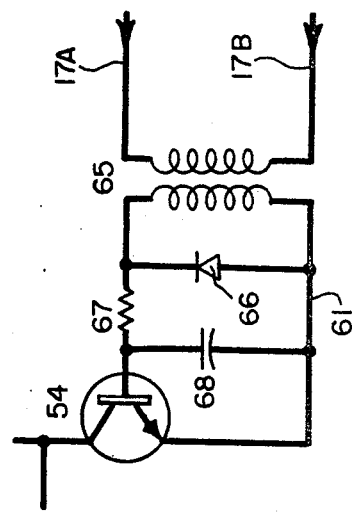
FIG. 5 is a partial schematic diagram depicting an alternate circuit arrangement for a portion of the system shown in FIG. 4.

In general a sawtooth voltage waveform is developed across capacitor 53, as a function of the output signal from op amp 51 and the conduction level of NPN type transistor 52. The frequency regulating signal, including timing pulses from a VCO or from a digital frequency source, is applied over conductors 17A and 17B, diode 62 and resistors 63 and 64. Thus each timing pulse received over conductors 17A and 17B rapidly gates transistor 54 on and capacitor 53 is quickly discharged. Another circuit for receiving the timing pulses over conductors 17A, 17B is shown in FIG. 5. The pulses are passed over transformer 65 and the secondary circuit including diode 66, resistor 67 and capacitor 68 to the base or input connection of transistor 54. Thus the precise circuit and manner of connection to pass the frequency information from the basic oscillator stage to the sawtooth generator circuit 30 may be varied.

In FIG. 4 op amp 51 is a linear amplifier and has a feedback loop, including transistor 52 and conductor 70, to provide an output or charging current for capacitor 53 which is extremely linear. Thus the sawtooth voltage waveform from the capacitor 53 is applied over the emitter-coupled stages 55, 56 and then passed over conductor 32 to resistor 42 in the circuit of FIG. 6. The emitter-coupled stages 55, 56 (FIG. 4) offer a high input impedance and thus avoid loading of the capacitor 53. No significant current is passed over line 32 which only provides the output sawtooth voltage waveform signal to the other portions of the circuit. It is noted that the same sawtooth waveform signal is applied over feedback line 31 and resistors 71, 72 to the upper input connection of op amp 50. The other input connection of this op amp is coupled over a resistor 73 and a conductor 34 to the movable arm of reference potentiometer 33. Thus this other op amp 50 connected in the feedback loop for op amp 51 has the effect of accelerating the amount of charging current passed into the charging capacitor 53 as the frequency of operation rises, to maintain the amplitude of the sawtooth voltage waveform substantially constant. By increasing the charge rate at higher frequencies and decreasing the charge rate at lower frequencies, this constant amplitude of the output voltage waveform is readily maintained. By way of example, the charge current might be of the order of 10 milliamps at a given high frequency, and at one-tenth of this high frequency, the amount of the charging current would be reduced to 1 milliamp.

Figure 6:
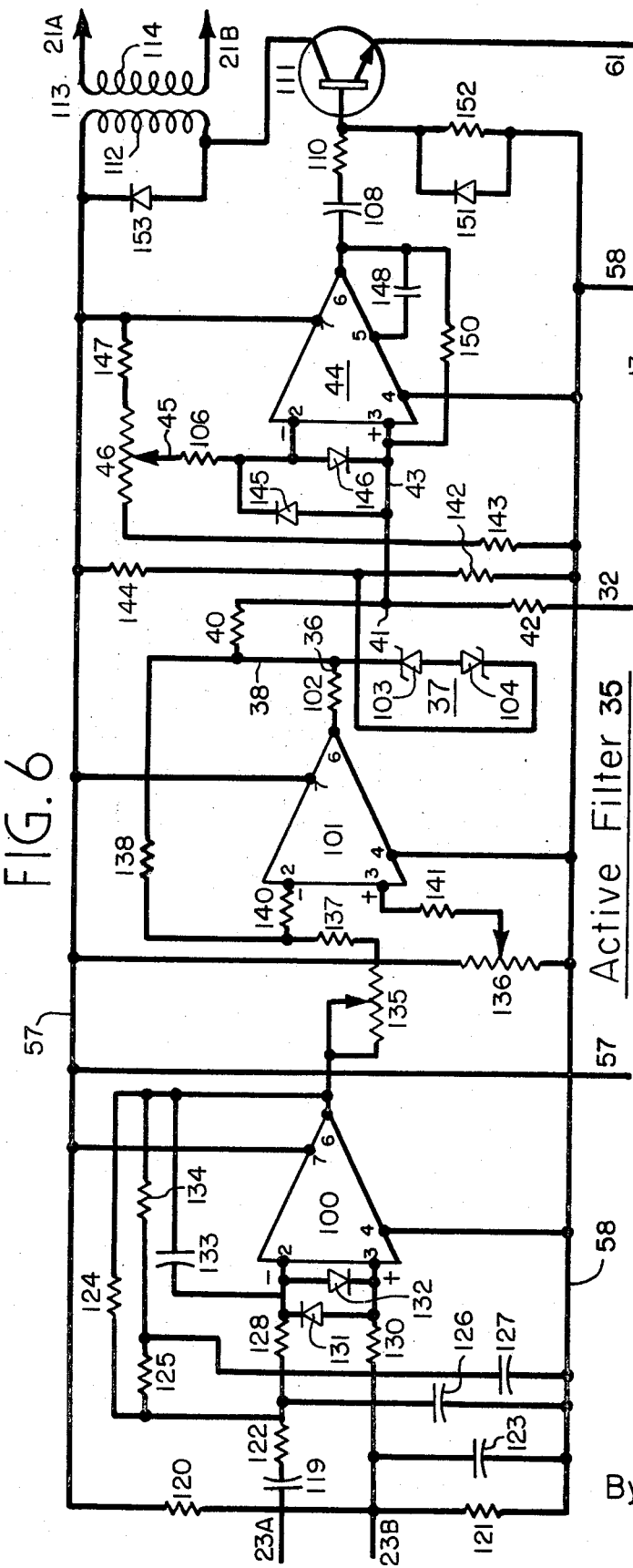

FIG. 6 depicts circuit details of the active filter 35, clipper 37 and comparator circuit 44. Although a two-pole active bandpass filter is illustrated, it will be appreciated that other types of filters can be selected to remove the extraneous noise and provide only the low-frequency modulation signal on the output line 36 of the filter. Considering the output signal from the inverter 12 (FIG. 1), rectification of this a-c signal in stage 22 produces an output signal such as that referenced 94 in FIG. 7A. This illustration is that of a rectified signal with no undesired low-frequency modulation. When these low-frequency variations, in the order of from 2 to 10 Hertz, are present, the rectified waveform is similar to that referenced 95 in FIG. 7B. However, it is desirable to remove the ripple or high-frequency noise and leave only the low-frequency signal depicted by the waveform 96 in FIG. 7C. This is the function of the active filter 35 including the two op amps 100, 101 in FIG. 6. As there shown, the rectified signal such as 95 in FIG. 7B is applied over input conductors 23A, 23B to the input connections of the first op amp 100. The output signal from this stage is applied through the second op amp 101, and the output signal of the active filter unit 35 is then passed over resistor 102 and conductor 36 to the common line 38. The interconnection and operation of such active filters are now well known and understood and need not be described herein. However a table of components will be set out at the end of the specification to facilitate practice of the invention with a minimum of experimentation.

Clipper stage 37 includes a pair of Zener diodes 103, 104, connected back-to-back between common line 38 and reference line 105. This circuit is arranged to remove transients and other unwanted high voltage signals from the low-frequency signal (FIG. 7C) which is present at the output side of the active filter. For example if each of the diodes 103, 104 is rated at 7.5 volts, then the total "swing" or amplitude excursion of the waveform 96 in FIG. 7C cannot exceed plus or minus 7.5 volts from the design center voltage. This operation is important because a line voltage transient could provide a very large transient through the active filter and possibly cause a disparity of the 1:1 correspondence between the pulses in the output signal on line 21 and the frequency of the input pulses on line 17.

Thus the signal represented by waveform 96 in FIG. 7C is applied over resistor 40 to the junction 41 in FIG. 6, and the sawtooth signal depicted by waveform 97 in FIG. 7D is applied over line 32 and resistor 42 to the same junction 41. Thus the signal applied over conductor 43 to the lower input connection of the op amp 44 in the comparator circuit is a composite of the low-frequency and sawtooth signals, and this composite signal is represented by the waveform 98 in FIG. 7E. The other input connection of op amp 44 is coupled over a resistor 106 and conductor 45 to the movable arm of a reference potentiometer 46. Thus whenever the voltage of the composite signal on line 43 reaches the reference voltage level (broken line 99 in FIG. 7E) applied to the upper input connection of op amp 44, the device changes state in accordance with well known operating principles. That is, the device will saturate and the output signal will change state. The output signal is represented by the waveform 107 in FIG. 7F, and is produced at the output connection 6 of op amp 44.

Considering the waveform 107, it is manifest that whenever the sawtooth waveform is reset or goes to zero as capacitor 53 (FIG. 4) is discharged, the negative-going or trailing edges of the pulses in waveform 107 are produced. The positive-going or leading edges of the pulses are generated at the times when the ramp portion of the composite signal 98 reaches the reference level 99 established by the setting of potentiometer 46.

The output signal from op amp 44 is passed through coupling capacitor 108 and resistor 110 to the base of an NPN type transistor 111. The collector of this transistor is coupled to the lower end of the primary winding 112 of an output transformer 113, which includes a secondary winding 114 connected to supply the output signal or timing pulses over conductors 21A, 21B. The emitter of transistor 111 is coupled to conductor 61. Accordingly the negative-going or trailing edges of the pulses in FIG. 7F do not affect the output circuit. However, each time the leading edge or positive-going portion of a pulse is applied through capacitor 108 and resistor 110, transistor 111 is rapidly driven into saturation and current flows through the primary winding of transformer 113 to pass an output timing pulse over conductors 21A, 21B. These pulses are referenced 115 in FIG. 7G. It is thus apparent that the individual pulses 115 are displaced in phase — or in time — by an amount and in a sense appropriate to compensate the undesired low-frequency modulation, such as that depicted by the waveform 96 in FIG. 7C.

The circuit illustrated in FIGS. 4 and 6 was energized from a voltage 20 volts positive, applied over conductor 57, relative to the reference or ground potential on conductor 58. The control voltage for application over conductors 23A, 23B was simply derived from a rectifier bridge circuit coupled in the system as shown generally in FIG. 1. Of course, a voltage divider arrangement can be utilized to insure that the amplitude of the resultant signal on line 23 is appropriate to the low level of the other signals in the illustrated control system. Solely to assist those skilled in the art to make and use this invention with a minimum of experimentation, and in no sense by way of limitation, a table of component identification and values is set out below.

| Component | Identification or Value | |
|---|---|---|
| 44,50,51 | μA709 | |
| 100,101 | μA741 | |
| 52 | 2N3906 | |
| 54,55,56,111 | 2N3904 | |
| 60 | 1N747 | 3.6 volts |
| 103,104 | 1N755 | 7.5 volts |
| 62,131,132,145, 146,151,153 | 1N914 | |
| 90 | 470 | |
| 83,144 | 820 | |
| 84,91,120,121,142 | 1 K | |
| 77,80,86,143 | 1.5 K | Resistance values in ohms - 5% ¼ watt |
| 82,102 | 2 K | |
| 110 | 3.3 K | |
| 147 | 4.3 K | |
| 33,46,135,136 | 5 K | |
| 63, 137 | 5.1 K | |
| 81 | 6.8 K | |
| 42,88,140 | 10 K | |
| 106,130,141 | 15 K | |
| 40,122 | 24 K | |
| 138 | 27 K | |
| 152 | 47 K | |
| 125,134 | 51 K | |
| 64,71,72,73, 128,150 | 100 K | |
| 124 | 200 K | |
| 74 | 1 M | |
| 53 | 0.047 | microfarad |
| 75 | 1.0 | microfarad |
| 76,85 | 4700 | picofarads |
| 78,87,148 | 100 | picofarads |
| 108 | 0.0022 | microfarad |
| 123 | 3.0 | microfarads |
| 126,133 | 0.1 | microfarad |
| 127 | 33 | microfarads |
| 119 | 78 | microfarads |

Figure 8:
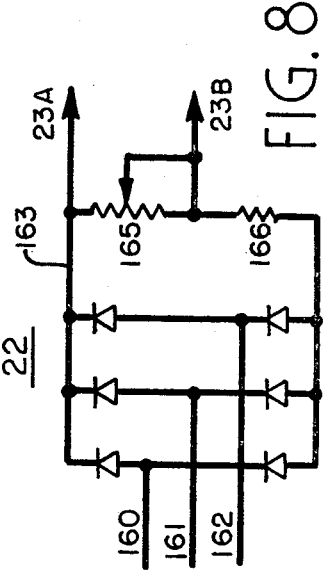

FIG. 8 depicts a rectifier arrangement suitable for providing the control voltage signal for application to the phase-shift stabilizer. As there shown, three conductors 160, 161, and 162 are coupled to the output conductors (not shown) between the inverter 12 and the motor 10. Of course, if a single phase inverter and motor drive system is utilized, only two conductors are provided. In FIG. 8 the diodes in rectifier bridge 22 rectify the a-c signal received over conductors 160, 162 to provide an output d-c voltage signal between conductors 163 and 164. A gain control potentiometer 165 and a resistor 166 are coupled in series between conductors 163, 164. Output conductor 23A is coupled to conductor 163, and the other output conductor 23B is coupled to the common connection between potentiometer 165 and resistor 166. Thus the control voltage signal is present between conductors 23A, 23B, and the system gain can be adjusted by varying the setting of potentiometer 165. In some systems it may not be necessary to provide a gain control, and for such systems the potentiometer 165 can be replaced by a simple resistor.

Figure 9:
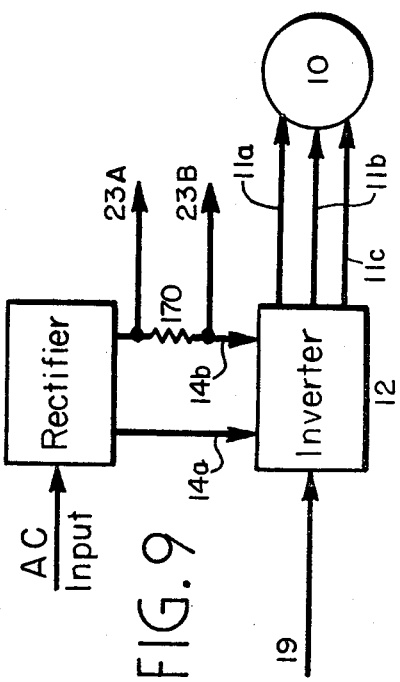
FIGS. 8 and 9 are diagrams of circuits suitable for use with the system of this invention.

FIG. 9 depicts another arrangement for providing the control voltage signal. As there shown the d-c bus current from rectifier 13 is passed over the main bus conductors 14a and 14b to the inverter 12. A dropping resistor 170, of only a few ohms resistance, is connected in the main line 14b. Accordingly the output signal on lines 23A, 23B provides a control voltage signal reflecting any low-frequency variations in the inverter d-c bus current. Presently the arrangements of FIGS. 8 and 9 have proven the most suitable for deriving an effective indication of the undesired low-frequency oscillations. There appears to be an interactive oscillation between the inverter and motor in many systems, and even motors with zero source impedance can oscillate at an undesired low frequency. However, the illustrated systems have proven effective to substantially eliminate the low-frequency oscillations without in any sense diminishing the precise frequency control in such systems.

While only a particular embodiment of the invention has been described and illustrated it is manifest that various modifications and alterations may be made therein. It is therefore the intention in the appended claims to cover all such modifications and alterations as may fall within the true spirit and scope of the invention.

I claim:
1. In a motor control system having an inverter for providing an a-c voltage, and means for supplying a frequency controlling signal including spaced timing pulses to regulate the frequency of inverter operation and correspondingly regulate the frequency of the inverter a-c output voltage, the improvement which comprises:

a phase shift stabilizer, coupled in series with the inverter, including circuit means for effecting a controlled phase shift of individual timing pulses while maintaining constant the average frequency of the phase-shifted timing pulses in the output signal supplied for regulating the inverter, and circuit means, coupled to the inverter and to the phase shift stabilizer, for providing a control voltage signal which varies as a function of undesired low-frequency variations, to effect a selective phase shift of the individual timing pulses as a function of such undesired low-frequency variations, in which said phase shift stabilizer comprises a filter, connected to receive said control voltage signal and to provide a low-frequency signal which varies with the low-frequency variations of the inverter a-c output voltage, a sawtooth generator, connected to receive the frequency-controlling signal and to provide a sawtooth voltage output signal of substantially constant amplitude and of a frequency determined by the timing pulses in the frequency-controlling signal, and a comparator stage, having a first input terminal connected to receive a reference signal, a second input terminal connected to receive a composite signal formed by mixing the low-frequency signal and the sawtooth voltage output signal, and an output terminal, connected to pass phase-shifted timing pulse signals toward the inverter to compensate for the low-frequency variations of the inverter a-c output voltage.

2. In a control system for energizing an a-c motor from an inverter, with an oscillator circuit for supplying a frequency-regulating signal including a train of timing pulses to control the frequency of inverter operation and correspondingly regulate the frequency of the inverter a-c output voltage, the improvement which comprises a phase shift stabilizer circuit, including:

circuit means, coupled to the inverter, for providing a control voltage signal including a high-frequency component related to the frequency of inverter operation, and which may include an undesired low-frequency component;

a filter circuit, connected to receive the control voltage signal from the circuit means, for removing the high-frequency component and providing an output signal including only the low-frequency component;

a sawtooth generator circuit, connected to receive the frequency-regulating signal and provide a sawtooth output voltage signal synchronized in frequency with the timing pulses in the frequency-regulating signal, including a feedback circuit for assisting in regulating operation of the sawtooth generator to provide a substantially constant amplitude output signal; and a comparator circuit, including a first input terminal connected to receive a reference signal, a second input terminal connected to receive a composite signal provided by mixing the sawtooth output voltage signal with the clipped low-frequency signal, and an output terminal for providing timing pulse signals of constant average frequency but which are individually phase-shifted to offset the undesired low-frequency modulation of the inverter a-c output voltage.

3. A control system as claimed in claim 2 and further comprising a clipper circuit, coupled to the filter circuit, for receiving the low-frequency signal and limiting the positive-going and negative-going peak excursions of the low-frequency signal.

4. A control system as claimed in claim 3 in which said clipper circuit comprises a pair of diodes connected back-to-back between the output side of the filter circuit and a plane of potential corresponding to the design center potential for the clipper circuit.

5. A control system as claimed in claim 2 in which the filter circuit is an active filter circuit, including a first operational amplifier connected to receive the control voltage signal at its input terminals, and a second operational amplifier connected to receive a reference signal at one of its input terminals and the output signal from the first operational amplifier at its other input terminal.

6. A control system as claimed in claim 2 in which the sawtooth generator circuit includes a charging capacitor, a first operational amplifier and a transistor connected to provide a substantially constant charging current for the charging capacitor, a discharge transistor coupled in parallel with the charging capacitor for rapidly completing a discharge path in response to receipt of a timing pulse from the oscillator circuit, and at least one emitter-coupled transistor coupled between the charging capacitor and the comparator circuit to supply the sawtooth output voltage signal for mixing with the clipped low-frequency signal.

7. A control system as claimed in claim 6 and in which said sawtooth generator circuit further comprises a feedback circuit, including a feedback conductor coupled to the emitter-coupled transistor, and a second operational amplifier coupled between the feedback conductor and the first operational amplifier to assist in maintaining a substantially constant amplitude of the sawtooth output voltage signal.

8. A motor control system as claimed in claim 2, in which said circuit means comprises a rectifier circuit, coupled between the output side of the inverter and the filter circuit of the phase-shift stabilizer, for providing the control voltage signal.

9. A motor control system as claimed in claim 2, in which said circuit means includes a resistor, coupled in series with the main d-c bus supplying energy to said inverter, for providing said control voltage signal as a function of undesired low-frequency variations in the d-c bus current.

* * * * *